United States Patent [19]

Huemmer et al.

[11] 4,309,524
[45] Jan. 5, 1982

[54] ANAEROBIC ADHESIVES COMPOSITIONS

[75] Inventors: Thomas F. Huemmer; Pallavoor R. Lakshmanan, both of Houston, Tex.

[73] Assignee: Gulf Oil Corporation, Pittsburgh, Pa.

[21] Appl. No.: 161,728

[22] Filed: Jun. 20, 1980

[51] Int. Cl.³ ............................................. C08F 220/20
[52] U.S. Cl. .................................. 526/284; 428/425.6; 428/425.8; 428/423.1; 526/313; 526/316; 156/331.1
[58] Field of Search ......................................... 526/284

[56] References Cited

U.S. PATENT DOCUMENTS 4,139,577  2/1979  Kuehn ................................. 526/284
4,215,209  7/1980  Ray-chaudhuri et al. ....... 526/323.2

Primary Examiner—Harry Wong, Jr.
Attorney, Agent, or Firm—Richard L. Kelly

[57] ABSTRACT

Improved anaerobic adhesives are provided which contain two monomer types. The first is a polyacrylate terminated ester of 3,4,3',4'-benzophenone tetracarboxylic acid. The second is an acrylate terminated urethane prepolymer that is prepared in part from abietyl alcohol.

15 Claims, No Drawings

ANAEROBIC ADHESIVES COMPOSITIONS

CROSS REFERENCE TO RELATED APPLICATIONS

The polyacrylate terminated esters of 3,4,3',4'-benzophenone tetracarboxylic acid employed as one component of the anaerobic adhesive compositions of the present invention are disclosed and claimed in our copending application Ser. No. 161,638, filed of even date herewith.

The acrylate-terminated esters of a urethane prepolymer employed as one component of the anaerobic adhesive compositions of the invention are disclosed and claimed in our copending application Ser. No. 161,612, filed of even date herewith.

BACKGROUND OF THE INVENTION

Anaerobic adhesives constitute a known class of materials which are stable in the presence of oxygen (air), but polymerize readily when isolated from exposure to air. While numerous types of anaerobic adhesives are available to the art, the art is seeking anaerobic adhesives of improved properties. A principal object of the present invention is to provide novel and improved anaerobic adhesive compositions.

SUMMARY OF THE INVENTION

The applicants have invented certain novel anaerobic adhesive compositions which contain two essential monomers. One of the essential monomers is a polyacrylate terminated ester of 3,4,3',4'-benzophenone tetracarboxylic acid (BTA). The second essential monomer is an acrylate terminated urethane prepolymer.

DETAILED DESCRIPTION OF THE INVENTION

The polyacrylate-terminated esters of BTA employed in the compositions of the present invention have the formula:

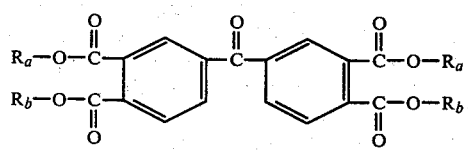

where $R_a$ is an alkyl group containing up to about 18 carbon atoms, or an alkoxy ether moiety having the structure:

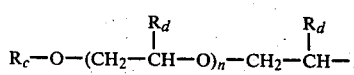

where $R_c$ is an alkyl group containing up to about 18 carbon atoms, $R_d$ is hydrogen or a methyl group, and n is zero or a small integer, and $R_b$ has the structure:

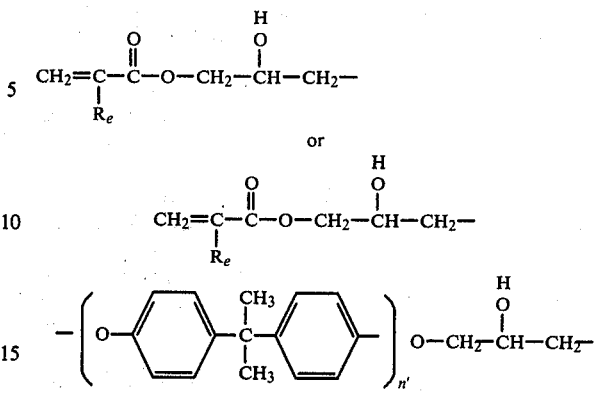

where $R_e$ is hydrogen or a methyl group and n' is a small integer.

The compounds of formula (1) are prepared by a two-step process. In the first step, two (2) mols of a suitable alcohol are reacted with one (1) mol of 3,4,3',4'benzenephenone tetracarboxylic acid dianhydride (BTDA) to provide a diester having the formula:

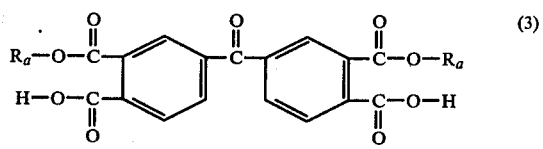

This reaction proceeds readily in a suitable solvent at mild temperatures and in the absence of catalysts.

In the second step of the process, one (1) mol of the diester product of formula (3) is reacted with two (2) mols of either a glycidyl ester of an acrylic acid, such as acrylic acid itself, or an alkacrylic acid such as methacrylic acid, or (b) a half acrylate ester of an epoxy resin prepared from bisphenol-A and epichlorohydrin. When the final product of formula (1) is prepared from the glycidyl ester of an acrylic acid, the $R_b$ groups of formula (1) will have the structure:

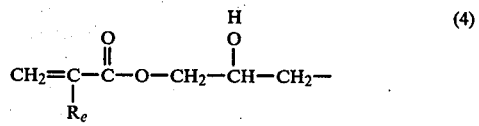

When the final product of formula (1) is prepared from a half acrylate ester of the epoxy resin prepared from bisphenol-A and epichlorohydrin, the $R_b$ groups of formula (1) will have the structure:

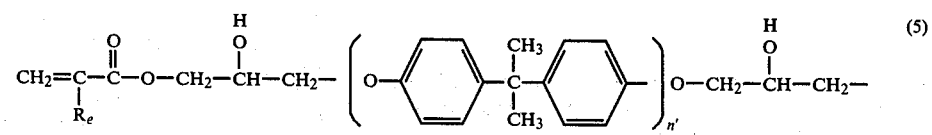

The second step of the process is readily carried out by simply charging the requisite quantity of the glycidyl ester of the acrylic acid (or alternatively the half acrylate ester of the epoxy resin) to a solvent solution of the diester prepared in the first step of the process. The reaction is run in the presence of a catalyst, preferably a quaternary ammonium compound, at mild temperatures of less than 100° C. The progress of the reaction can be followed by determining the acid number of the reaction medium.

The alcohol employed to esterify the BTDA in the first step of the process is not critical for most purposes. Alkanols containing up to about 18 carbon atoms can be employed. When it is desired to introduce into the monomer an alkoxy ether moiety of the structure of formula (2), the BTDA should be esterified with an alkyl ether of a glycol or a polyglycol such as the methyl, ethyl and butyl ethers of ethylene glycol, propylene glycol, diethylene glycol, and the like. Many such ether glycols are commercially available under the trade designation "Carbitol".

The polyacrylated-terminated esters of BTA are more fully disclosed and claimed in our copending application Ser. No. 161,638 filed of even date herewith. Those descriptions are incorporated herein by reference.

The acrylate-terminated urethane prepolymers employed in the compositions of the present invention have the formula:

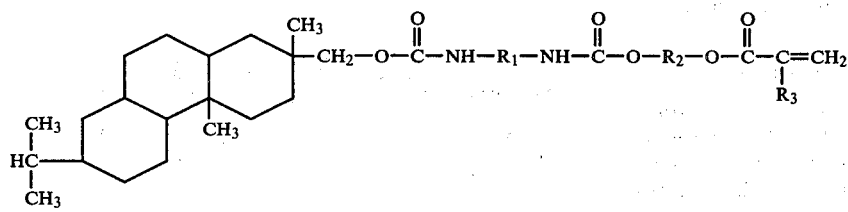

In formula (6), the fused 14 carbon atom ring is a phenanthrene ring which may contain up to three double bonds. This segment of the monomer is derived from abietyl alcohol which is obtained by the reduction of abietic acid. In the course of the reduction, some of the double bonds in the ring may be hydrogenated.

In formula (6), $R_1$ is a divalent radical derived from a diisocyanate. Typically, the radical will be an arylene group such as a phenylene, tolylene, or a naphthylene group. The $R_1$ also can be an alkylene group such as a hexamethylene group.

In formula (6), $R_2$ likewise is a divalent radical. The simplest such radical is that shown below:

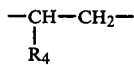

where $R_4$ is a hydrogen atom or an alkyl group. $R_2$ may be considerably more complex in structure as shown in formulae (7) and (8) below:

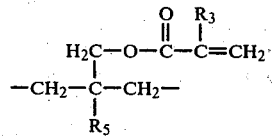

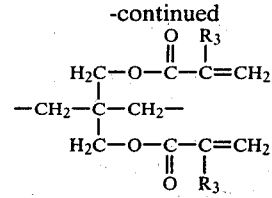

In formulae (7) and (8), $R_3$ is a hydrogen atom or an alkyl group. In formula (7), $R_5$ is an alkyl group.

In formula (6) $R_3$ is a hydrogen atom or an alkyl group.

The compounds of formula (6) are prepared by initially reacting abietyl alcohol with a diisocyanate compound such as tolylene diisocyanate (TDI) in a 1/1 molar ratio. This reaction takes place under mild reaction conditions similar to those reported in the art for reacting diisocyanate compounds with other alcohols.

In the next step of the process, the intermediate compound of the above reaction is reacted in a 1/1 molar ratio with an acrylate-containing molecule having one hydroxyl group in the molecule that is free to react with the free isocyanate group of the first intermediate product. The simplest of these hydroxyl containing acrylate compounds is a hydroxyalkyl ester of acrylic acid, such as betahydroxypropyl acrylate (HPA). This second reaction proceeds smoothly under mild conditions similar to those employed in the first step of the process.

The abietyl alcohol employed in the preparation of the compounds of interest is that prepared by the reduction of abietic acid. A suitable material is sold under the trademark name Abitol and is identified as being a mixture of tetrahydroabietyl alcohol, dihydroabietyl alcohol, and dehydroabietyl alcohol.

Examples of suitable diisocyanates include tolylene diisocyanate, isophorone diisocyanate, hexamethylene diisocyanate, xylene diisocyanate, naphthalene diisocyanate, 3,3'dimethyl-4,4'-diphenylmethane diisocyanate, durene diisocyanate, and lysine diisocyanate.

The hydroxyl-containing acrylate compound employed in the synthesis is preferably a hydroxyalkyl acrylate, such as beta-hydroxyethyl acrylate, beta-hydroxyethyl methacrylate, beta-hydroxypropyl acrylate and the like. Where it is desired to incorporate two or more acrylate moieties into the compounds of interest, the hydroxyl-containing acrylate compound employed in the synthesis can be a partial ester formed between a polyhydric alcohol containing three or more hydroxy groups and two or more acrylic or methacrylic acids. Typical intermediates of this type include pentaerythritol triacrylate and trimethylolpropane diacrylate.

When the compounds of formula (6) are prepared from trimethylol propane diacrylate, the $R_2$ group will have the structure shown in formula (7) above. When the compounds of formula (6) are prepared from pentaerythritol triacrylate, the $R_2$ group will have the structure shown in formula (8) above.

The acrylate-terminated urethane prepolymers are more disclosed and claimed in our copending application Ser. No. 161,612, filed of even date herewith. Those descriptions are incorporated herein by reference.

The two monomers are employed in the anaerobic adhesive compositions in a weight ratio of the polyacrylate terminated ester of BTA to the acrylate-terminated urethane prepolymer from about 1/4 to about 4/1. The preferred ratio is about 0.5/1.0 to about 1/1.

While anaerobic adhesive compositions of good properties can be formulated to contain only the two mandatory monomers, frequently it is desirable to include in the formulations other polymerizable unsaturated monomers of the type frequently included in anaerobic adhesive compositions. When three or more monomers are employed in the composition, the combined weight of the polyacrylate-terminated ester of BTA and the acrylate-terminated urethane prepolymer should constitute 25-90, preferably 50-85 and more especially about 60-75 weight % of the total monomers included in the composition.

Examples of polymerizable unsaturated monomers that can be employed in the compositions of the invention include low molecular weight vinyl terminated polymers of conjugated-1,3 dienes such as butadiene, complex esters or ethers containing two or more vinyl or allyl groups such as diallyl phthalate, diallyl maleate, diallyl fumarate, triallyl cyanaurate, triallyl phosphate, the diacrylate and dimethacrylate esters of glycols, such as ethylene glycol, propylene glycol, hexanediol-1,6 and the polyglycols such as diethylene glycol and especially tetraethylene glycol, glycerol trimethacrylate, pentaerythritol triacrylate, pentaerythritol tetraacrylate, trimethylolpropane triacrylate, methacrylic acid anhydride, and allyl ethers of polyhydroxy compounds such as ethylene glycol diallyl ether, pentaerythritol tetrallyl ether, and the like. Nonterminally unsaturated compounds such as diethyl fumarate can similarly be used. Many proprietary resins containing terminal allyl and acrylate groups are commercially available and can be employed. Many of these resins are modified urethane and epoxy resins.

The anaerobic adhesive compositions of the invention also will contain minor quantities of other components conventionally included in such compositions. The compositions will contain a free radical generating polymerization initiator having an activity such that it will initiate polymerization of the monomers at ambient temperature in the absence of oxygen, but will not initiate polymerization in the presence of air. Cumene hydroperoxide and t-butyl hydroperoxide are the initiators of choice. They customarily are employed at levels of about 1.0-10.0 weight %, preferably about 2.0-8.0 weight %, and more especially about 4.0-6.0 weight %, based on the monomers. Other minor components frequently are included as cure accelerators. Examples of such compounds include dimethyltoluidine and saccharin.

The following examples are set forth to illustrate more clearly the principle and practice of the invention to those skilled in the art. Where parts or percentages are set forth, they are parts and percentages by weight unless otherwise noted.

PREPARATION OF POLYACRYLATE TERMINATED ESTERS

EXAMPLE 1

Part A

A round bottom flask equipped with a stirrer, reflux condenser, and thermometer was charged with 181 grams (0.56 mol) of BTDA, 182 grams (1.12 mol) of butyl Carbitol and 194 grams of toluene. The mixture was heated to 120° C. and maintained at this temperature overnight. An infrared spectrum of the product indicated that only trace quantities of BTDA remained in the reaction mixture.

Part B

The apparatus described in Part A was modified by adding a tube to bubble air through the flask's contents and by adding a dropping funnel. To the contents described in Part A were added 8 grams of trimethylbenzyl ammonium chloride and 0.05 gram of p-methoxyphenol (added as a polymerization inhibitor). The reaction mixture was heated to 70° C. and 160 grams (1.12 mol) of glycidyl methacrylate was added to the reaction mixture over a period of 0.5 hour. Heating was continued for another 10 hours at 75° C., or until a titration of the reaction mixture showed that essentially all of the carboxyl groups had reacted. A slow stream of air was bubbled through the reaction mixture to inhibit polymerization of the acrylate groups. The toluene was removed by vacuum distillation to provide a viscous resin containing 0.21 equivalent of methacrylic acid per 100 grams of product.

EXAMPLE 2

Part A

The apparatus described in Example 1, Part A, was charged with 360 grams (2 equivalents) of an epoxy resin prepared from bisphenol-A and epichlorohydrin (sold under the designation Epon 826), 72 grams (1 equivalent) of acrylic acid, 200 ml of toluene, 0.8 gram of trimethylbenzyl ammonium chloride and 0.2 gram of p-methoxyphenol. The reaction mixture was heated for 1 hour at 95° C. at the end of which time the mixture contained no free carboxyl group. After removing toluene by vacuum distillation, the final product had an epoxy number of 3.7 and a viscosity of 7,500 cps @ 25° C.

Part B

The apparatus of Part A was charged with 100 grams (0.23 equivalent) of the product of Part A, 296 grams (0.46 equivalent) of the dibutyl Carbitol ester of BTA and 600 ml of toluene. The mixture as charged was not homogeneous. The mixture was heated to 100° C. and after 30 minutes the mixture became clear and homogeneous. After heating for an additional six hours, the reaction was complete as the IR spectrum showed no absorption characteristic of the epoxy group. The resin had a viscosity of about 8,000 cps @ 50° C.

PREPARATION OF ACRYLATE TERMINATED URETHANE PREPOLYMERS

EXAMPLE 3

Part A

A round-bottom flask equipped with a dropping funnel, a stirrer, and a thermometer was charged with 216 grams (0.75 equivalent) of a technical grade abietyl alcohol sold under the trade name Abitol, 1.8 gram of dibutyl tin diacetate and 300 ml of toluene. Toluene diisocyanate (TDI) in the amount of 131 grams (0.75 equivalent) was added dropwise to the flask at a uniform rate over a period of about 0.25 hour. The contents of the flask rose to 55° C., at which point cooling was applied to the flask to maintain this temperature. After all of the TDI had been added, the contents of the flask were heated to 70° C. and maintained at this temperature for 1.5 hours.

Part B

The reaction mixture of Part A was cooled to ambient temperature and 0.15 gram of p-methoxyphenol polymerization inhibitor was added. Beta-hydroxypropyl acrylate (HPA) in the amount of 98 grams (0.75 equivalent) was added to the reaction over a period of 0.50 hour. After the addition of the HPA was completed, the reaction mixture was heated to 75° C. and maintained at this temperature for six hours to complete the reaction.

The toluene solvent was removed by vacuum distillation. A clear, yellow-colored resinous product was obtained. The viscosity was 275 cps at 100° C. The infrared spectrum of the product showed no absorption at 2240 cm$^{-1}$. The absence of absorption in this region indicates that all of the isocyanate groups had reacted.

EXAMPLE 4

A product similar to that described in Example 3 was prepared in the identical manner, except that 0.75 equivalent of isophorone diisocyanate was employed in lieu of the toluene diisocyanate. The product was light yellow in color and its infrared spectrum showed no absorption characteristic of isocyanate groups.

PREPARATION OF ANAEROBIC ADHESIVES

EXAMPLE 5

A series of anaerobic adhesive compositions were prepared and had the composition shown in Table I.

TABLE I

| Component | Composition A | Composition B |
|---|---|---|
| Resin of Example 1 | 2.25 | — |
| Resin of Example 2 | — | 2.25 |
| Resin of Example 3 | 5.25 | 5.25 |
| TEGDMA[(1)] | 2.5 | 2.5 |
| t-butyl hydroperoxide | 0.55 | 0.55 |
| Benzoquinone | 0.005 | 0.005 |
| Dimethyl toluidine | 0.27 | 0.27 |

[(1)]Tetraethyleneglycol dimethacrylate.

Both compositions were employed to bond thin sheets of steel together at an applied rate of about 1 lb. of adhesive/1,000 ft$^2$ of glue line. Laps shear tensile values were obtained on specimens cured for 72 hours at room temperature. Similar values were measured on specimens cured for 2 hours at 250° F. Similar data were obtained on commercial anaerobic adhesives as controls. Control A was a product of Locktite Corporation and sold under the designation "Lock It." Controls B, C, and D were products of the 3M Company and sold under the designation numbers 4170, 4172, and 4173. The data are set forth in Table II.

TABLE II

| | Shear Lap Tensile, psi | |
|---|---|---|
| Sample | Room Temperature Cure | 250° C. Cure |
| A | 683 | 1535 |
| B | 1325 | 1777 |
| Control A | 221 | 233 |
| Control B | 439 | 365 |
| Control C | 371 | 380 |
| Control D | 562 | 395 |

It is noted that the lap shear tensile values for the products of the invention were significantly higher than those of the commercial controls.

EXAMPLE 6

The experimental adhesives and Controls B, C, and D described in Example 5 were used to bond steel to steel, aluminum to aluminum, glass to glass, and acrylic to acrylic. All of the substrates were given a prime coat of a product sold by the 3M Company under the designation 4180. The adhesive was applied at a rate of 1 lb/1,000 ft$^2$ glue line. The "set time" for each sample was noted, this being the elapsed time after which the two surfaces could not be slid over each other. Lap shear tensile data were measured after curing for 72 hours at room temperature. The results are shown in Table III.

TABLE III

| Sample | Substrate | Set Time | Lap Shear, psi[(1)] |
|---|---|---|---|
| A | St/St | 2 minutes | 875/980 |
| B | " | 5 minutes | 421/600 |
| Control B | " | Immediate | 360/185 |
| Control C | " | " | 310/380 |
| Control D | " | " | 275/315 |
| A | Al/Al | 2 minutes | 93/225 |
| B | " | 5 minutes | 125/125 |
| Control B | " | Immediate | 75/68 |
| Control C | " | " | 100/125 |
| Control D | " | " | 98/120 |
| A | Glass/Glass | 10 minutes | 265/320 |
| B | " | 20 minutes | 255/272 |
| Control B | " | Immediate | 100/250 |
| Control C | " | " | 155/185 |
| Control D | " | " | 75/160 |
| A | Acrylic/Acrylic | 45 minutes | 85/130 |
| B | Acrylic/Acrylic | 20 minutes | 98/150 |
| Control B | Acrylic/Acrylic | Immediate | 20/108 |
| Control C | Acrylic/Acrylic | " | 39/195 |
| Control D | Acrylic/Acrylic | " | 70/80 |

[(1)]Two measurements made on duplicate samples.

From the data, it is seen that for each of the substrates, the compositions of the invention give higher bond strengths as measured by Lap Shear Tensile values.

EXAMPLE 7

A series of four anaerobic adhesives were formulated as shown in Table IV.

TABLE IV

| | Composition | | | |
|---|---|---|---|---|
| Component | A | B | C | D |
| Resin of Example 2 | — | 5 | — | 2.25 |
| Resin of Example 3 | — | — | 5 | 5.25 |

TABLE IV-continued

| Component | Composition | | | |
|---|---|---|---|---|
| | A | B | C | D |
| TEGDMA[1] | 10 | 5 | 5 | 2.5 |
| t-butyl hydroperoxide | 0.55 | 0.55 | 0.55 | 0.55 |
| Benzoquinone | 0.005 | 0.005 | 0.005 | 0.005 |
| Dimethyl toluidine | 0.27 | 0.27 | 0.27 | 0.27 |

[1]Tetraethyleneglycol dimethacrylate.

Each of the adhesives was tested in bonding steel to steel using the procedures described in Example 5. The data are set forth in Table V.

TABLE V

| | Lap Shear, psi | |
|---|---|---|
| Sample | Room Temperature Cure | 250° F. Cure |
| A | 155 | 67 |
| B | 385 | 105 |
| C | 492 | 1197 |
| D | 1300 | 1725 |

The data show that significantly better results are obtained with Sample D which contained both a polyacrylate terminated ester of 3,4,3',4'-benzophenone tetracarboxylic acid (BTA)—the resin of Example 2—and an acrylate terminated urethane prepolymer—the resin of Example 3.

EXAMPLE 8

Several additional adhesive formulations were prepared to show the formulation flexibility of the invention and are set forth in Table VI

TABLE VI

| Component | Composition | | | | | |
|---|---|---|---|---|---|---|
| | A | B | C | D | E | F |
| Resin of Example 1 | 6 | 4.5 | 2.25 | — | — | — |
| Resin of Example 2 | — | — | — | 6 | 4.5 | 2.25 |
| Resin of Example 3 | 1.5 | 3.0 | 5.25 | 1.5 | 3.0 | 5.25 |
| TEGDMA[1] | 2.5 | 3.0 | 5.25 | 1.5 | 3.0 | 5.25 |
| t-butylhydroperoxide | 0.55 | 3.0 | 5.25 | 1.5 | 3.0 | 5.25 |
| Benzoquinone | 0.005 | 3.0 | 5.25 | 1.5 | 3.0 | 5.25 |
| Dimethyl toluidine | 0.27 | 3.0 | 5.25 | 1.5 | 3.0 | 5.25 |

[1]Tetraethyleneglycol dimethacrylate.

Each formulation was tested in bonding steel to steel using the procedures described in Example 5. The data are set forth in Table VII.

TABLE VII

| | Lap Shear, psi | |
|---|---|---|
| Sample | Room Temperature Cure | 250° F. Cure |
| A | 636 | 885 |
| B | 555 | 1650 |
| C | 893 | 1713 |
| D | 1260 | 1290 |
| E | 1443 | 1650 |
| F | 1357 | 1645 |

What is claimed:

1. In an anaerobic adhesive composition which contains a plurality of polymerizable unsaturated monomers and a free radical generating polymerization initiator and which will cure at ambient temperature in the absence of oxygen, but will not cure at ambient temperature in the presence of air; the improvement which consists essentially of employing as the principal polymerizable monomers a mixture of:

(a) a polyacrylate terminated ester of 3,4,3',4'-benzophenone tetracarboxylic acid (BTA), and (b) an acrylate terminated urethane prepolymer; the weight ratio of component (a) to component (b) being from about 1/4 to about 4/1; said component (a) having the formula:

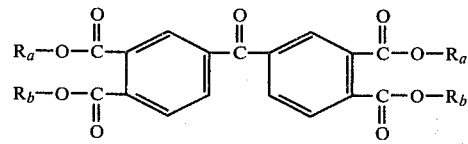

where $R_a$ is an alkyl group containing up to about 18 carbon atoms, or an alkoxy ether moiety having the structure:

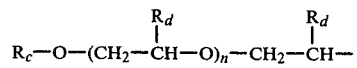

where $R_c$ is an alkyl group containing up to about 18 carbon atoms, $R_d$ is hydrogen or a methyl group, and n is zero or a small integer, and $R_b$ has the structure:

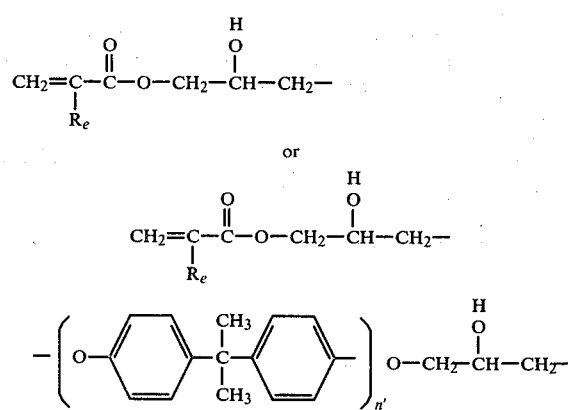

where $R_e$ is hydrogen or a methyl group and n' is a small integer, said component (b) having the formula:

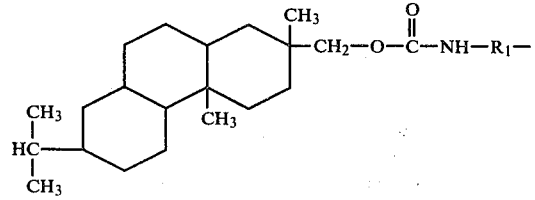

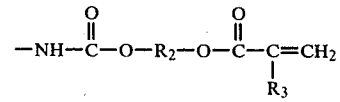

where the phenanthrene ring contains up to 3 double bonds, $R_1$ is an alkylene or arylene divalent radical, and $R_2$ is a divalent alkylene radical, or a divalent radical having the structure:

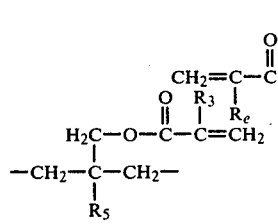

or a divalent radical having the structure:

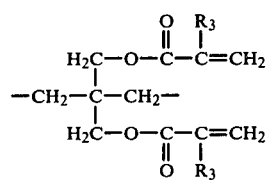

$R_3$ is a hydrogen or a methyl group and $R_5$ is an alkyl group.

2. A composition of claim 1 in which the weight ratio of component (a) to component (b) is about 0.5/1.0 to about 1/1.

3. A composition of claim 1 which contains at least one polymerizable unsaturated monomer in addition to components (a) and (b), said components (a) and (b) constituting about 25–75 weight % of the total monomers in said composition.

4. A composition of claim 3 which contains tetraethylene glycol dimethacrylate as one of the polymerizable monomers.

5. A composition of claim 1 in which $R_a$ of composition (a) has the structure:

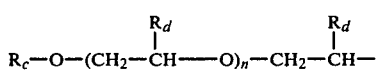

where $R_c$ is an alkyl group containing up to about 18 carbon atoms, $R_d$ is hydrogen or a methyl group, and n is zero or a small integer.

6. A composition of claim 1 in which $R_b$ of component (a) has the structure:

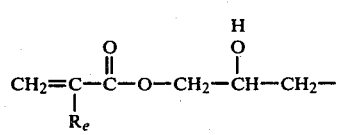

where $R_e$ is hydrogen or a methyl group.

7. A composition of claim 5 in which $R_b$ of component (a) has the structure:

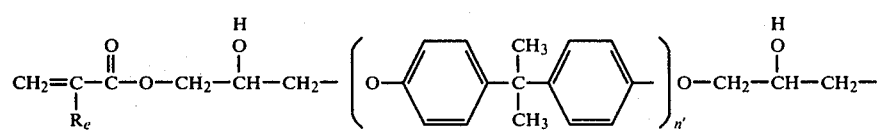

where $R_e$ is hydrogen or a methyl and n' is a small integer.

8. A composition of claim 1 in which $R_b$ of component (a) has the structure:

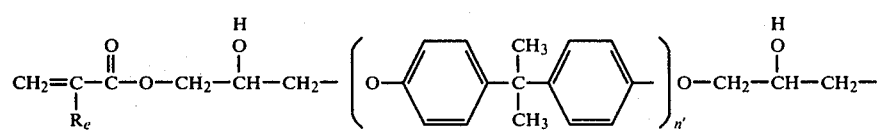

where $R_e$ is hydrogen or a methyl and n' is a small integer.

9. A composition of claim 1 in which $R_1$ of component (b) is an arylene group.

10. A composition of claim 9 in which the arylene group is a tolylene group.

11. A composition of claim 1 in which $R_1$ of component (b) is the residue of isophorone diisocyanate.

12. A composition of claim 1 in which $R_2$ of component (b) has the structure:

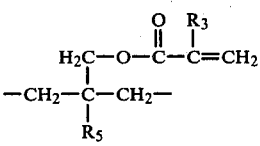

where $R_4$ is a hydrogen atom or an alkyl group.

13. A composition of claim 1 in which $R_2$ of component (b) has the structure:

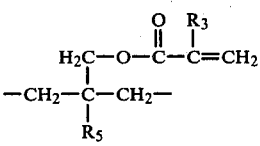

where $R_3$ is a hydrogen atom or an alkyl group and $R_5$ is a methyl group.

14. A composition of claim 1 in which $R_2$ of component (b) has the structure:

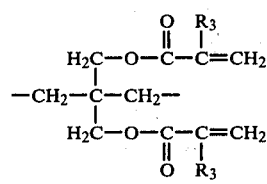

where $R_3$ is hydrogen or a methyl group.

15. A composition of claim 7 in which $R_1$ of component (b) is a tolylene group and $R_2$ of component (b) has the structure:

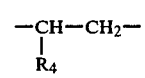

where $R_4$ is a hydrogen atom or an alkyl group.

* * * * *